(12) United States Patent
Barritt et al.

(10) Patent No.: US 11,456,957 B2
(45) Date of Patent: Sep. 27, 2022

(54) REDUCED FORWARDING RULES FOR AEROSPACE NET WORK NODES

(71) Applicant: SoftBank Corp., Tokyo (JP)

(72) Inventors: Brian Barritt, San Jose, CA (US); Paul Heninwolf, San Carlos, CA (US); Erik Kline, Saratoga, CA (US)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 17/146,506

(22) Filed: Jan. 12, 2021

(65) Prior Publication Data

US 2021/0409333 A1 Dec. 30, 2021

Related U.S. Application Data

(60) Provisional application No. 63/043,948, filed on Jun. 25, 2020.

(51) Int. Cl.
*H04L 12/801* (2013.01)
*H04L 47/17* (2022.01)
*H04L 47/33* (2022.01)

(52) U.S. Cl.
CPC .............. *H04L 47/17* (2013.01); *H04L 47/33* (2013.01)

(58) Field of Classification Search
CPC ................................ H04L 47/17; H04L 47/33
See application file for complete search history.

(56) References Cited

U.S. PATENT DOCUMENTS

| 7,002,571 | B2 | 2/2006 | Lake et al. |
| 8,630,275 | B2 | 1/2014 | Ji et al. |
| 9,729,381 | B2 * | 8/2017 | Hancock ................. G01C 21/26 |
| 10,373,483 | B2 | 8/2019 | Choi et al. |
| 10,447,575 | B1 * | 10/2019 | Morris ..................... H04L 12/66 |
| 10,771,571 | B2 * | 9/2020 | Whiting .............. H04L 61/2038 |

(Continued)

FOREIGN PATENT DOCUMENTS

CN 108881029 A 11/2018

OTHER PUBLICATIONS

Zhou, Jin Zhou et al., A Low-Latency Peer-to-Peer Approach for Massively Multiplayer Games, 4th International Workshop on Agents and P2P Computing, Jul. 2005, pp. 1-12.

(Continued)

*Primary Examiner* — Rasheed Gidado
(74) *Attorney, Agent, or Firm* — Botos Churchill IP Law (57) ABSTRACT

A method for managing nodes of a network includes receiving location information from each of a plurality of nodes in a network, where at least one node is moving relative to another node of the network. The method then includes converting the received location information for each node into a corresponding network address. The corresponding network address is based on a hierarchical cell-based partitioning scheme. The method further includes identifying a target region for a given node of the network based on a plurality of routing paths. The target region encompasses two or more nodes in the network that are next hops for the given node and that have a common segment in the corresponding network addresses. The method then includes sending forwarding rules to one or more nodes in the network. The forwarding rules includes the common segment to identify the next hops for the given node.

18 Claims, 7 Drawing Sheets

(56) References Cited

U.S. PATENT DOCUMENTS

| | | | |
|---|---|---|---|
| 2008/0008179 A1* | 1/2008 | Chen .................... | H04W 4/20 370/392 |
| 2011/0074547 A1* | 3/2011 | Seshadri ................ | G01S 1/68 340/8.1 |
| 2012/0263042 A1* | 10/2012 | Natarajan ............. | H04L 45/22 370/238 |

OTHER PUBLICATIONS

International Search Report and Written Opinion for Application No. PCT/US21/35182 dated Sep. 24, 2021.

* cited by examiner

REDUCED FORWARDING RULES FOR AEROSPACE NETWORK NODES

CROSS REFERENCE TO RELATED APPLICATIONS

The present application claims the benefit of the filing date of U.S. Provisional Application No. 63/043,948, filed Jun. 25, 2020, the entire disclosure of which is incorporated by reference herein.

BACKGROUND

Information can be transmitted over directional point-to-point networks or point-to-multipoint networks, such as aerospace and other mobile networks. In such networks, links can be formed between pairs of nodes by aiming transceivers of each node pair towards each other. Links can also be formed by steering the transceivers of a network node either toward a discrete user terminal or node or toward some discrete point to cover a general geographic area. In some implementations, nodes may include non-geostationary satellite orbit (NGSO) satellites or other high-altitude platforms (HAPs) that are in motion relative to the Earth.

BRIEF SUMMARY

Aspects of the disclosure provide for a method. The method includes receiving location information from each of a plurality of nodes in a network, the plurality of nodes including at least one node that is moving relative to another node of the network; converting the received location information for each node into a corresponding network address, the corresponding network address being based on a hierarchical cell-based partitioning scheme; identifying, by one or more processors of a network controller, a target region for a given node of the network based on a plurality of routing paths, the target region encompassing two or more nodes in the network that are next hops for the given node and that have a common segment in the corresponding network addresses; and sending, by the one or more processors of the network controller, one or more forwarding rules to one or more nodes in the network, the one or more forwarding rules including the common segment to identify the next hops for the given node.

In one example, the hierarchical cell-based partitioning scheme is based on a spherical geometry library. In another example, the converting of the received location information for each node includes, for each node of the plurality of nodes, projecting a location of the node into a model of the Earth and a cube encapsulating the Earth using the location information from the node, the cube encapsulating the Earth being partitioned using the hierarchical cell-based partitioning scheme into a plurality of cells; and determining the corresponding network address for the location of the node based on a given cell of the plurality of cells in which the projected location falls. In this example, the corresponding network address optionally includes a segment of a cell identifier of the given cell.

In a further example, the converting of the received location information for each node includes retrieving, from a database, a cell identifier that corresponds with a location of the node based on the received location information, the cell identifier being derived from the hierarchical cell-based partitioning scheme. In yet another example, the identifying the target region includes generating a network configuration for the network for the plurality of routing paths. In a still further example, the two or more nodes in the target region includes a moving node; and wherein the method also includes receiving new location information for the moving node, determining a new network address for the moving node based on the new location information, and, when the new network address does not have the segment that is common to the corresponding network addresses of the two or more nodes in the target region, sending, by the one or more processors of the network controller, the new network address to the moving node.

In another example, the method also includes sending, by the one or more processors of the network controller, the corresponding network address to each node of the plurality of nodes in the network. In a further example, the method also includes determining, by the one or more processors of the network controller, a routing path through the network based on the location information of the plurality of nodes, the routing path identifying a source node and a plurality of next hops; and wherein the sending of the one or more forwarding rules includes sending instructions to the source node for encapsulating the plurality of next hops in a header of a packet for segment routing along the routing path.

Other aspects of the disclosure provide for a network controller for a network. The network includes at least one node that is moving relative to another node. The network controller includes one or more processors. The one or more processors are configured to receive location information from each of a plurality of nodes in the network; convert the received location information for each node into a corresponding network address, the corresponding network address being based on a hierarchical cell-based partitioning scheme; identify a target region for a given node in the network based on a plurality of routing paths, the target region encompassing two or more nodes in the network and that are next hops for the given node that have a common segment in the corresponding network addresses; and send one or more forwarding rules to the one or more nodes in the network, the one or more forwarding rules including the common segment to identify the next hops for the given node.

In one example, the hierarchical cell-based partitioning scheme is based on spherical geometry library. In another example, the one or more processors are further configured to convert the received location information for each node based on a location of a node in a model of the Earth, wherein the model of the Earth includes a cube encapsulating the Earth that is partitioned using the hierarchical cell-based partitioning scheme into a plurality of cells. In this example, the corresponding network address optionally includes a segment of a cell identifier of one of the plurality of cells in which the node is located in the model of the Earth.

In a further example, the one or more processors are configured to convert the received location information for each node based on a database on which are stored a cell identifier that corresponds with a location of the node, the cell identifier being derived from the hierarchical cell-based partitioning scheme. In yet another example, the one or more processors are further configured to generate a network configuration for the network for the plurality of routing paths. In a still further example, the two or more nodes in the target region includes a moving node; and wherein the one or more processors are further configured to receive new location information for the moving node, determine a new network address for the moving node based on the new location information, and, when the new network address does not have the segment that is common to the corresponding network addresses of the two or more nodes in the target region, send the new network address to the moving node.

In another example, the one or more processors are further configured to send the corresponding network address to each node of the plurality of nodes in the network. In a further example, the one or more processors are further configured to determine a routing path through the network based on the location information of the plurality of nodes, the routing path identifying a source node and a plurality of next hops; and wherein the one or more forwarding rules includes instructions to the source node for encapsulating the plurality of next hops in a header of a packet for segment routing along the routing path.

Further aspects of the disclosure provide for a tangible, non-transitory computer-readable storage medium configured to store instructions. The instructions, when executed by one or more processors, cause the one or more processors to perform a method. The method includes receiving location information from each of a plurality of nodes in a network, the plurality of nodes including at least one node that is moving relative to another node of the network; converting the received location information for each node into a corresponding network address, the corresponding network address being based on a hierarchical cell-based partitioning scheme; identifying a target region for a given node in the network based on a plurality of routing paths, the target region encompassing two or more nodes in the network that are next hops for the given node and that have a common segment in the corresponding network addresses; and sending one or more forwarding rules to one or more nodes in the network, the one or more forwarding rules including the common segment to identify the next hop for the given node.

In one example, the hierarchical cell-based partitioning scheme is based on a spherical geometry library.

DETAILED DESCRIPTION

Overview

The technology relates to forwarding rules for a network including moving nodes. In particular, the forwarding rules may include location information for each node encoded using a hierarchical cell-based partitioning scheme. This way of encoding the location information may result in location information for a given region to have a same information segment, such as a prefix. Nodes within the given region may then be identified simply by the information segment in the forwarding rules, which may simplify the rules and save storage. In another implementation, the forwarding rules may be configured for segment routing in the network.

The network controller may receive location information from each of the plurality of nodes. The location information may be in GPS coordinates or another type of coordinate. The network controller may convert the received location information into a network address, such as an IPv6 address. In this example, the network address may be based on a hierarchical cell-based partitioning scheme, such as a spherical geometry library. The hierarchical cell-based partitioning scheme covers a geographic area in a plurality of cells and assigns cell identifiers to each cell.

The network controller includes at least a part of the cell identifier in the network address for each node. The network controller may enable routing through at least a portion of the network using the at least part of the cell identifier. The routing may include identifying a region encapsulating a plurality of nodes or client devices using a segment of the network address. The segment may correspond to the part of the cell identifier that corresponds to the given region. In other words, the segment may be common to the network address of all the nodes or client devices within the given region. In some examples, the segment may be a prefix.

In order to enable the routing, the network controller may send forwarding rules to the nodes that includes the common segment. Enabling the routing may also include sending to each node of the network the network address assigned to the node. A node, after receiving the forwarding rules, may perform routing to nodes identified by the common segment as a next hop in the forwarding rules.

Alternatively, segment routing may be implemented by sending, to a source node, a plurality of network addresses for a routing path to a destination node in a header of a packet. The network addresses for each node in the routing path may be determined using the hierarchical cell-based partitioning scheme.

The technology described herein may allow for identification of nodes within a given region using a smaller amount of data. Using a hierarchical cell-based partitioning scheme, forwarding rules may be formulated based on segments that are common to a particular region. Using segment routing, forwarding rules may be encapsulated within a packet rather than requiring a separate lookup at each individual hop. As a result, the forwarding rules may be simplified and fewer updates to the forwarding rules may be needed. In addition, routing tables at each node may be reduced. Overall savings in storage, weight, and power may therefore occur. Forwarding throughput may also be improved, and packet processing latency may be improved.

Example Systems and Network

Figure 1:
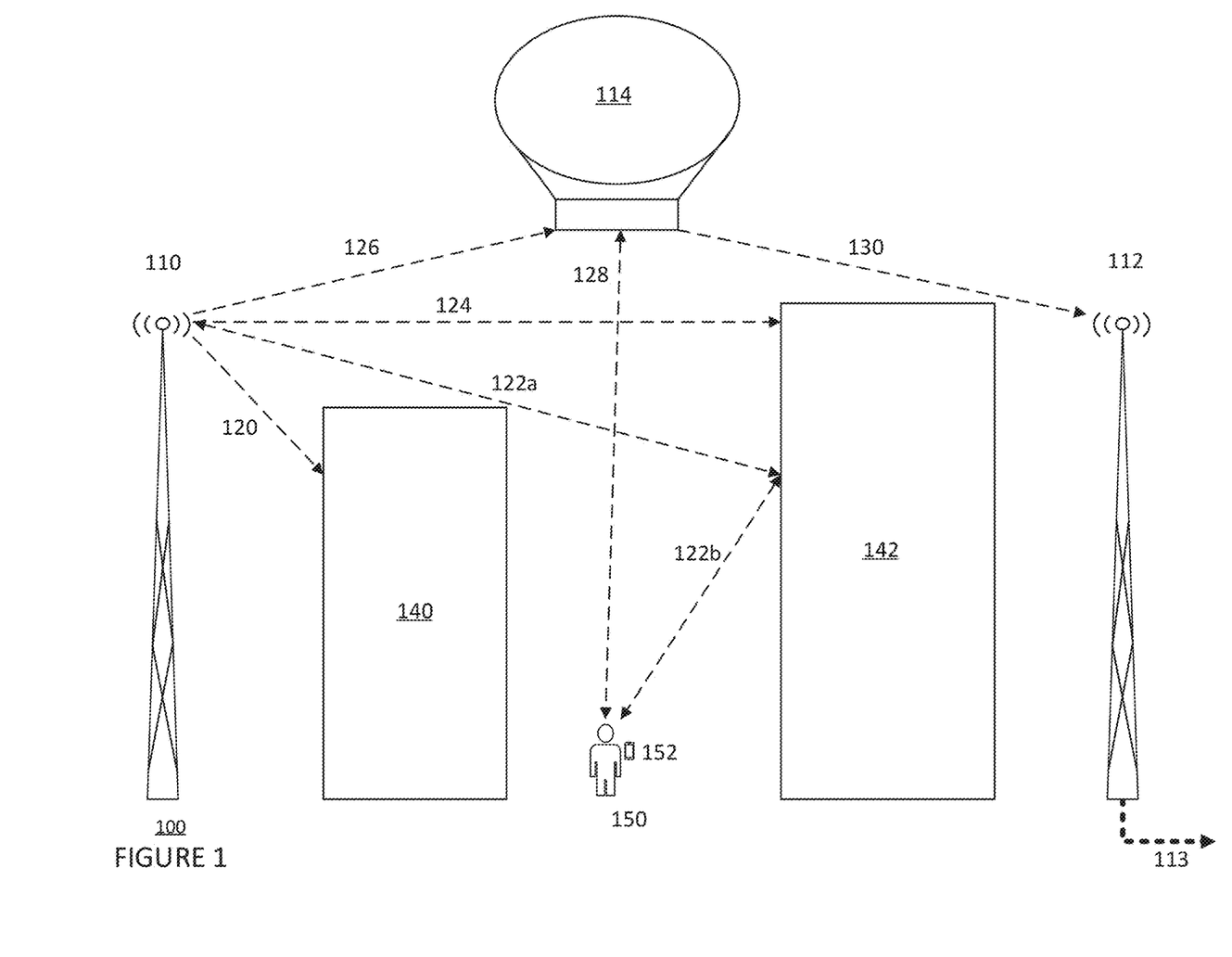
FIG. 1 is a pictorial diagram of a portion of an example network in accordance with aspects of the disclosure.

FIG. 1 is a pictorial diagram of an example system 100 of network nodes in a network. In particular, FIG. 1 shows a portion of an access layer of the network. The network may include nodes mounted on various land- and air-based devices, some of which may change position with respect to other nodes in the network over time. For example, as shown in FIG. 1, the network includes, as nodes, a first terrestrial tower 110 and a second terrestrial tower 112. The network also includes as a node a high-altitude platform 114. As shown, HAP 114 is a balloon. In other embodiments, the HAP may be a blimp, an airplane, an unmanned aerial vehicle (UAV) such as a drone, a satellite, or another platform capable of low Earth orbit.

Nodes in the network may be equipped to transmit and receive mmWave signals or other very high frequency signals. Additionally or alternatively, nodes in the network may be equipped to transmit and receive other radio-frequency signals, optical signals, or other communication signal capable of travelling through free space. Arrows shown projecting from nodes represent possible paths 120, 122a, 122b, 124, 126, 128, 130 for a transmitted communication signal. As shown in FIG. 1, some possible paths may be blocked by buildings, such as buildings 140, 142. For example, a signal following path 120 from node 110 may be angled below the horizon and be blocked by building 140. A signal following path 122a from node 110 may be angled above path 120, avoiding building 140, but then may contact building 142. The signal following path 122a may reflect off building 142 and follow path 122b towards the ground location of a user 150, carrying a client device 152. A signal following path 124 from node 110 may be angled towards or above the horizon, nearly parallel to the ground, passing over building 140, but then may be blocked by building 142. A signal following path 126 from node 110 may be angled above the horizon and reach node 114. A signal following path 128 from node 114 directed to the ground location of user 150. A signal following path 130 from node 114 may be angled below the horizon, pass over building 142, and reach node 112.

Also shown in FIG. 1, a signal may be transmitted from the client device 152 of the user 150 back towards one or more nodes of the network. For example, a signal from the client device 152 may be transmitted back along paths 122b and 122a towards node 110. Another signal from the client device 152 may be transmitted back along path 128 towards node 114. In addition, multiple users or multiple client devices may form bi-directional access links with a given node of the network at a given point in time, in addition to the user 150 and the client device 152 shown in FIG. 1.

The network nodes as shown in FIG. 1 is illustrative only, and the network may include additional or different nodes. For example, in some implementations, the network may include additional HAPs and/or additional terrestrial towers. When the network includes at least one low Earth orbit or high Earth orbit satellite as well as one other type of HAP, the network may be defined as a hybrid HAP/satellite network.

Figure 2:
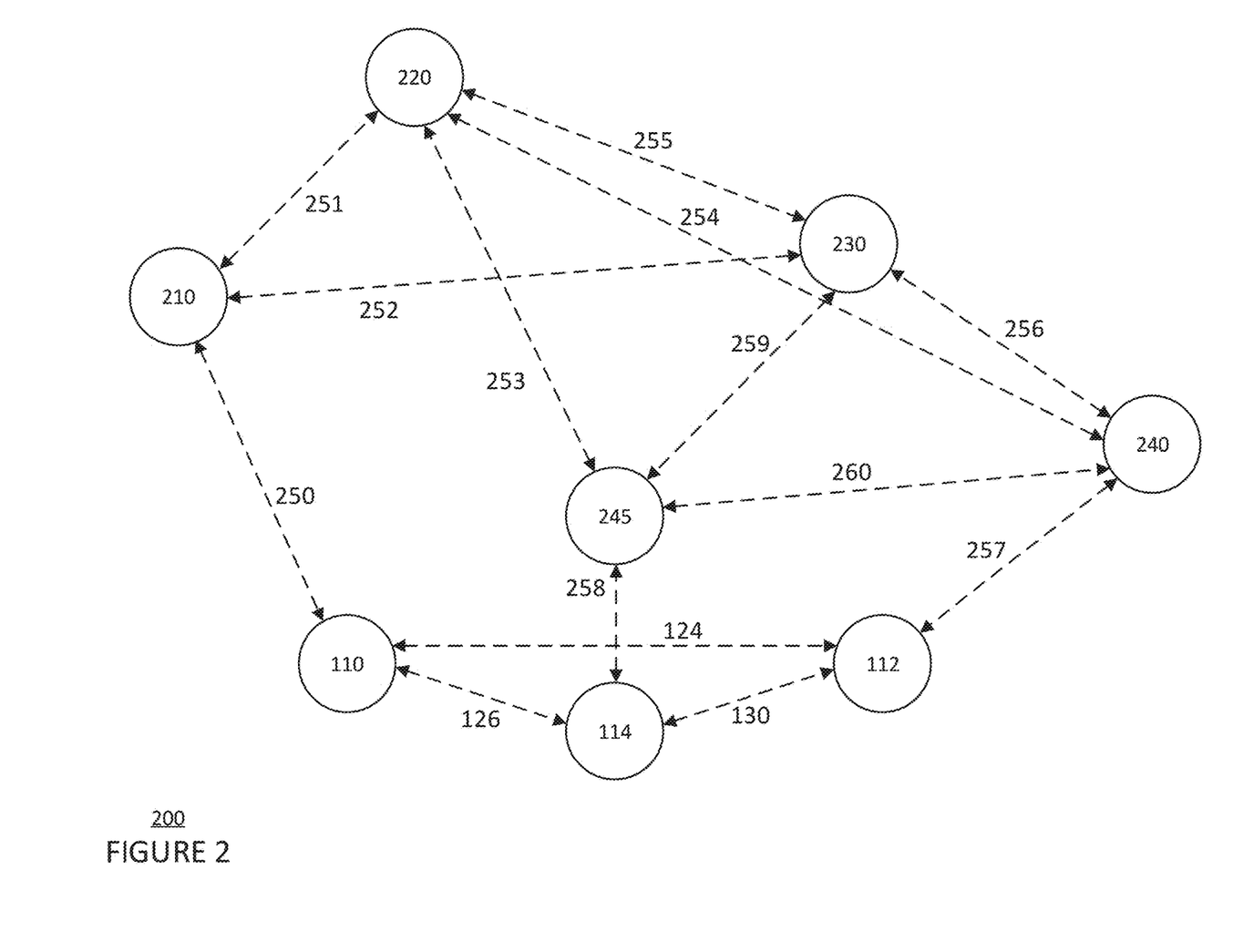
FIG. 2 is a diagram of an example network in accordance with aspects of the disclosure.

For example, as shown in FIG. 2, the network 200 that includes the system 100 may also include as nodes additional terrestrial towers 210, 220, and additional non-terrestrial nodes 230, 240, and 245. Arrows shown between a pair of nodes represent possible communication paths between the nodes. In addition to paths 124, 126, and 130 corresponding to the paths shown in FIG. 1, paths 250-260 are shown between the nodes. The network 200 as shown in FIG. 2 is illustrative only, and in some implementations the network 200 may include additional or different nodes. The status information received from the nodes of the network may include the location information of HAP 114 or weather conditions at locations of nodes 110, 112, 210, 220, 230, 240, and 245 at a current time or a future time. The location information of HAP 114 may include a projected trajectory or set location, such as a future location at the future time that is in signal range of the terrestrial towers 110, 112.

In some implementations, the network may serve as an access network for client devices such as cellular phones, laptop computers, desktop computers, wearable devices, tablet computers, or other user equipment. For example, nodes 110, 112, 114 may connect to the datacenters via wireless, fiber, or cable backbone network links or transit networks operated by third parties. The nodes 110, 112, 114 may provide wireless access for the users, and may forward user requests to the datacenters and return responses to the users via the backbone network links.

In particular, the first terrestrial tower 110, the second terrestrial tower 112, and the HAP 114 may include wireless transceivers configured to operate in a cellular or other mobile network, such as 5G NR (new radio) networks or LTE networks. The nodes 110, 112, 114 may operate as gNodeB stations, eNodeB stations, or other wireless access points, such as WiMAX or UMTS access points. One or more terrestrial towers in the network may include an optical fiber or other link connecting the one or more terrestrial towers to another terrestrial tower or datacenter. For example, the second terrestrial tower 112 may include fiber 113, shown by a dotted arrow, that connects to another terrestrial tower (not shown). As shown in FIG. 1, user 150 carrying a client device 152 may be configured to communicate with one or more of the nodes in the network. The network also may be connected to a larger network, such as the Internet, and may be configured to provide a client device with access to resources stored on or provided through the larger computer network.

Figure 3:
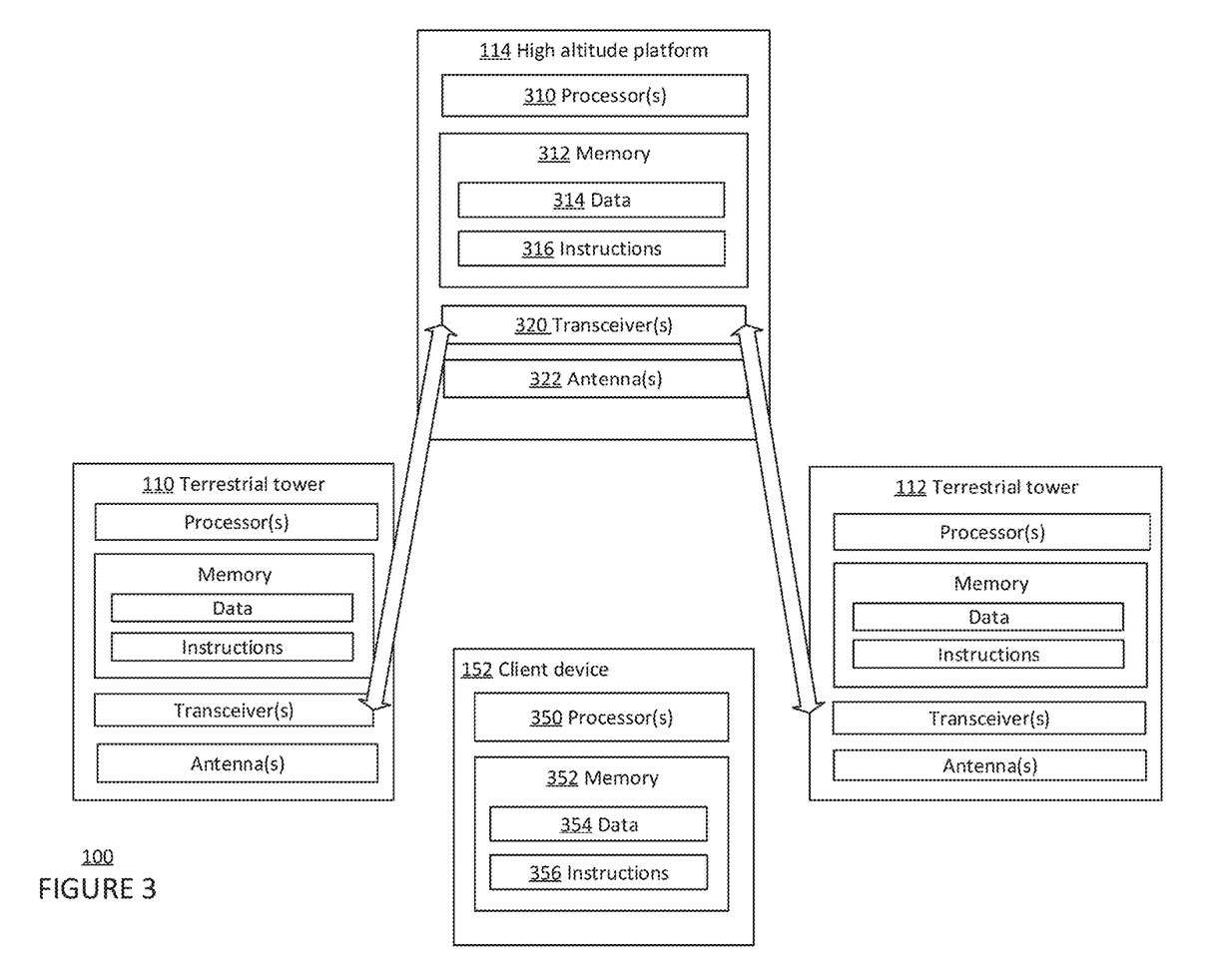
FIG. 3 is a functional diagram of the portion of the network shown in FIG. 1 in accordance with aspects of the disclosure.

As shown in FIG. 3, each node, such as first terrestrial tower 110, second terrestrial tower 112, and HAP 114, may include one or more transceivers configured to transmit and receive communication signals and create one or more communication links with another node in the network. Referring to HAP 114 as an example, each of the nodes, may include one or more processors 310, memory 312, one or more transceivers 320, and one or more antenna 322. While only terrestrial towers 110, 112 and HAP 114 are shown, other terrestrial towers and HAPs in the network may have the same or as similar configurations.

The one or more processors 310 may be any conventional processors, such as commercially available CPUs. Alternatively, the one or more processors may be a dedicated device such as an application specific integrated circuit (ASIC) or other hardware-based processor, such as a field programmable gate array (FPGA). The one or more processors 310 may be configured to operate according to a given protocol architecture for a mobile network, such as 5G NR architecture or LTE radio protocol architecture. Although FIG. 3 functionally illustrates the one or more processors 310 and memory 312 as being within the same block, it will be understood that the one or more processors 310 and memory 312 may actually comprise multiple processors and memories that may or may not be stored within the same physical housing. Accordingly, references to a processor or computer will be understood to include references to a collection of processors or computers or memories that may or may not operate in parallel.

Memory 312 stores information accessible by the one or more processors 310, including data 314, and instructions 316, that may be executed by the one or more processors 310. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 314 and instructions 316 are stored on different types of media. In the memory of each node, such as memory 312 of HAP 114, a forwarding information base or forwarding table may be stored that indicate how signals received at each node should be forwarded, or transmitted. For example, the forwarding table stored in memory 312 may indicate that a signal received from ground station 110 should be forwarded to HAP 114.

Data 314 may be retrieved, stored or modified by the one or more processors 310 in accordance with the instructions 316. For instance, although the system and method are not limited by any particular data structure, the data 314 may be stored in computer registers, in a relational database as a table having a plurality of different fields and records, XML documents or flat files. The data 314 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 314 may comprise any information sufficient to identify the relevant information, such as numbers, descriptive text, proprietary codes, references to data stored in other areas of the same memory or different memories (including other network locations) or information that is used by a function to calculate the relevant data.

The instructions 316 may be any set of instructions to be executed directly (such as machine code) or indirectly (such as scripts) by the one or more processors 310. For example, the instructions 316 may include the given protocol architecture for the mobile network of which the node is a part. The given protocol architecture may include a split architecture between a central unit and a distributed unit. In addition, the given protocol architecture may define a control plane, a user plane, or other protocol layers. The given protocol architecture may also include an interface that defines a plurality of messages for use in communication between the protocol layers. The instructions 316 may be stored as computer code on the computer-readable medium. In that regard, the terms "instructions" and "programs" may be used interchangeably herein. The instructions 316 may be stored in object code format for direct processing by the one or more processors 310, or in any other computer language including scripts or collections of independent source code modules that are interpreted on demand or compiled in advance. Functions, methods and routines of the instructions 316 are explained in more detail below.

The one or more transceivers 320 may include at least one wireless transceiver mounted to actuators that can be controlled, or steered, to point in a desired direction. To form a wireless link between two nodes, such as the node associated with the HAP 114 and the node associated with the first terrestrial tower 110, the wireless transceivers of the respective nodes can be controlled to point in the direction of one another so that data can be sent and received between the nodes. For nodes with fiber or cable connections, such as second terrestrial tower 112, the one or more transceivers 320 may also include at least one transceiver configured to communicate via a fiber or cable connection.

As further shown in FIG. 3, the client device 152 associated with user 150 may be a personal computing device or a server with one or more processors 350, memory 352, data 354, and instructions 356 similar to those described above with respect to the one or more processors 310, memory 312, data 314, and instructions 316. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client device 152 may be any device capable of processing instructions and transmitting data to and from humans and other computers including general purpose computers, network computers lacking local storage capability, and set-top boxes for televisions. In some embodiments, client devices may be associated with one or more self-defined network (SDN) applications and may have one or more northbound interface (NBI) drivers.

Figure 4:
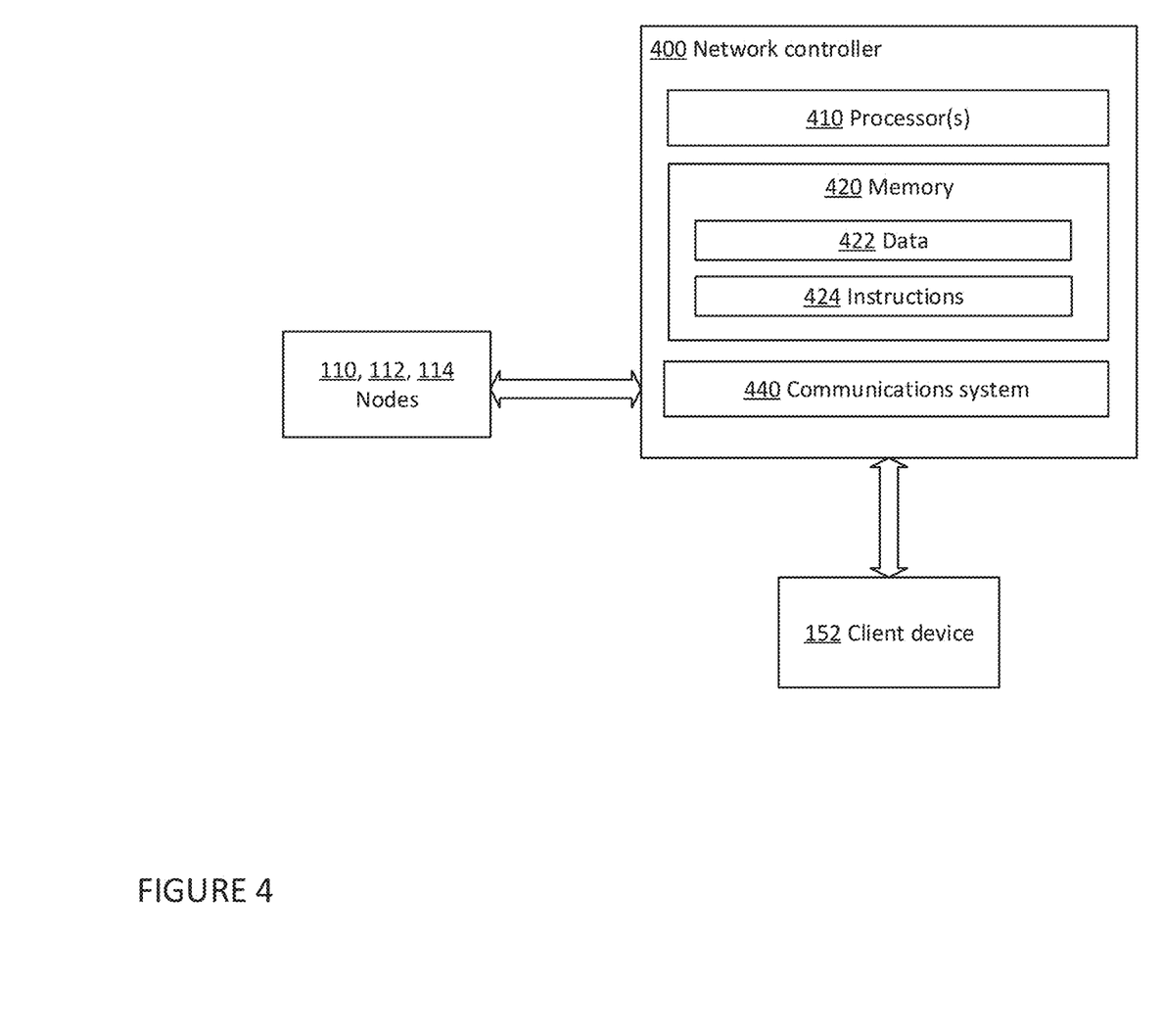
FIG. 4 is a functional diagram of a network controller in accordance with aspects of the disclosure.

In some implementations, the network can be an SDN that is controlled by an SDN controller, such as network controller 400 depicted in FIG. 4. The network controller 400 may be located at one of the network nodes or at a separate platform, such as, for example, in a datacenter. The nodes of the network, including nodes 110, 112, 114 may be configured to communicate with one another using the steerable transceivers, such as the one or more transceivers 320. As the HAPs in the network, such as HAP 114, move with respect to other nodes in the network, such as terrestrial towers 110, 112, some network links may become infeasible due to range of the transceivers or obstacles between the nodes. Thus, the configuration of the network may require regular (i.e., periodic) or irregular reconfiguration using the network controller 400 to maintain connectivity and to satisfy determined network flows.

FIG. 4 is a block diagram of network controller 400. The network controller 400 may be configured to send control messages to the nodes of the network to provide reconfiguration according to updated topology, to pass routing information, and to schedule reconfigurations to transmit client data. For example, the control messages may include forwarding rules for implementing the one or more routing paths through the network. As shown in FIG. 4, the network controller 400 may include one or more processors 410, memory, 420, and communications system 440. The one or more processors 410 may be similar to the one or more processors 310 described above. Memory 420 may store information accessible by the one or more processors 410, including data 422 and instructions 424 that may be executed by processor 410. Memory 420, data 422, and instructions 424 may be configured similarly to memory 312, data 314, and instructions 316 described above. The data 422 may include a table representing all of the available nodes and possible links in the network 200 at a given time or time frame. The instructions 424 may include one or more modules for managing topology and routing, determining topology, determining network flows, solving for network configurations, controlling flight of a given HAP, or scheduling future network configurations.

The communications system 440 may be configured to communicate with the nodes of network, such as nodes 110, 112, 114, as well as one or more client devices, such as client device 152. In some embodiments, the communication system 440 includes a Control to Data-Plane Interface (CDPI) driver configured to communicate with a CDPI agent at each of the nodes 110, 112, 114. In addition, the communications system 440 of the network controller 400 may include one or more NBI agents configured to communicate with an NBI driver at each client device associated with one or more SDN applications. The communication system 440 may optionally or alternatively be configured to transmit and receive a signal via radio frequencies, optical frequencies, optical fiber, cable, or other communication means to and from the nodes in the network and the one or more client devices.

Example Implementations and Methods

In addition to the operations described above and illustrated in the figures, various implementations and methods will now be described. It should be understood that the described operations and steps do not have to be performed in the precise order provided below. Rather, various operations and steps can be handled in a different order or simultaneously, and operations and steps may also be added or omitted.

The network controller 400 may receive location information from each of the plurality of nodes or client devices. The location information may be in GPS coordinates or another type of coordinate. The network controller 400 may convert the received location information into a network address, such as an IPv6 address. In this example, the network address may be based on a hierarchical cell-based partitioning scheme. In particular, the hierarchical cell-based partitioning scheme may be a discretization of spherical geometry, which may more closely map to points on the Earth than using planar geometry. The discretization may be performed by number cells along a Hilbert curve, a space-filling curve that converts multiple dimensions into one dimension. The resulting spherical geometry library listing the enumerated cells in the spherical geometry, such as the S2 library, may be used as the hierarchical cell-based partitioning scheme.

To convert the received location information into the network address using the hierarchical cell-based partitioning scheme in this example, the received location information for a given node is projected into a model of the Earth. The model of the Earth includes a cube encapsulating a spherical representation of the Earth, and the projection includes a transformation to maintain a ratio of the size of the projection to a whole of the area as it moves from the spherical area to the cubic area. Each side of the cube is further broken down using a quad-tree. In other words, each side of the cube (a square) is divided into equal quarters (also squares), then each of those quarters are divided into equal quarters (also squares), and so on. Each iteration of the quartering is a different hierarchical level, and the model may include 30 levels, or more or less. Using the Hilbert curve, each resulting cell is given an identifier. As a result, the identifier for a given cell may identify hierarchical information, such as the location of the given cell in each hierarchical level. In the S2 library, the identifier may be 64 bits. When all 64 bits of the identifier is used, the identified cell may be on the order of a few millimeters wide.

Alternatively, the cell identifiers identifying hierarchical information for the model of the Earth may be predetermined and stored in a database. To convert the received location information into the network address, the network controller 400 may retrieve from the database a cell identifier that corresponds with the coordinates from the received location information.

Figure 5:
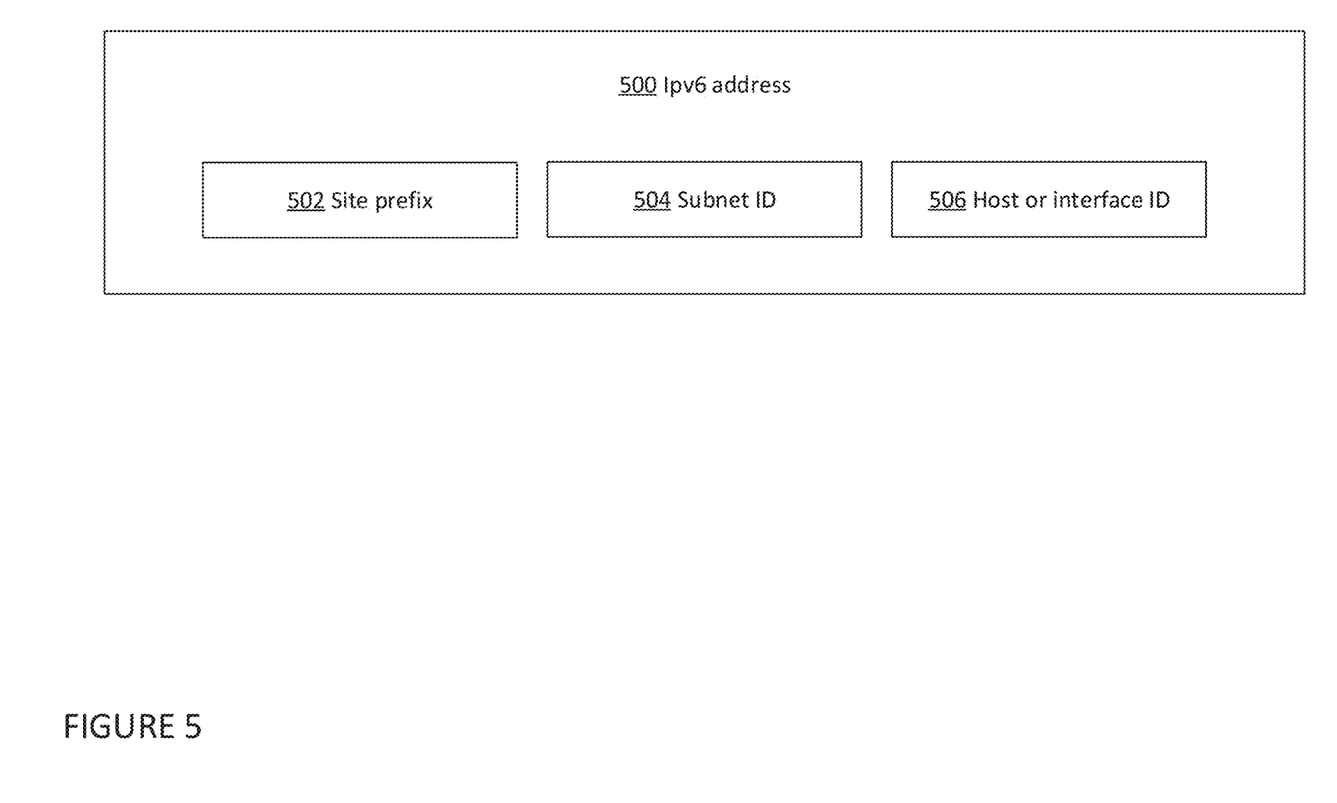
FIG. 5 is a pictorial diagram of a network address in accordance with aspects of the disclosure.

The network controller 400 includes at least a part of the cell identifier in the network address for each node. In some implementations, the entire cell identifier for a location of a given node may be used in the network address of the given node. For example, the entire cell identifier may be a site prefix and/or a subnet identification in an IPv6 address. In other implementations, a portion of the cell identifier, such as the portion that identifies a location in a subset of hierarchical levels, may be included in the network address. A portion of an S2 library identifier may be less than 64 bits. The subset of hierarchical levels may include a mid-level hierarchical level and one or more higher-level hierarchical levels. As shown in FIG. 5, an IPv6 address 500 includes a site prefix 502, a subnet identification 504, and a host or interface identification 506. The portion of the cell identifier for each node may be configured as the site prefix of the IPv6 address for the corresponding node.

Figure 6:
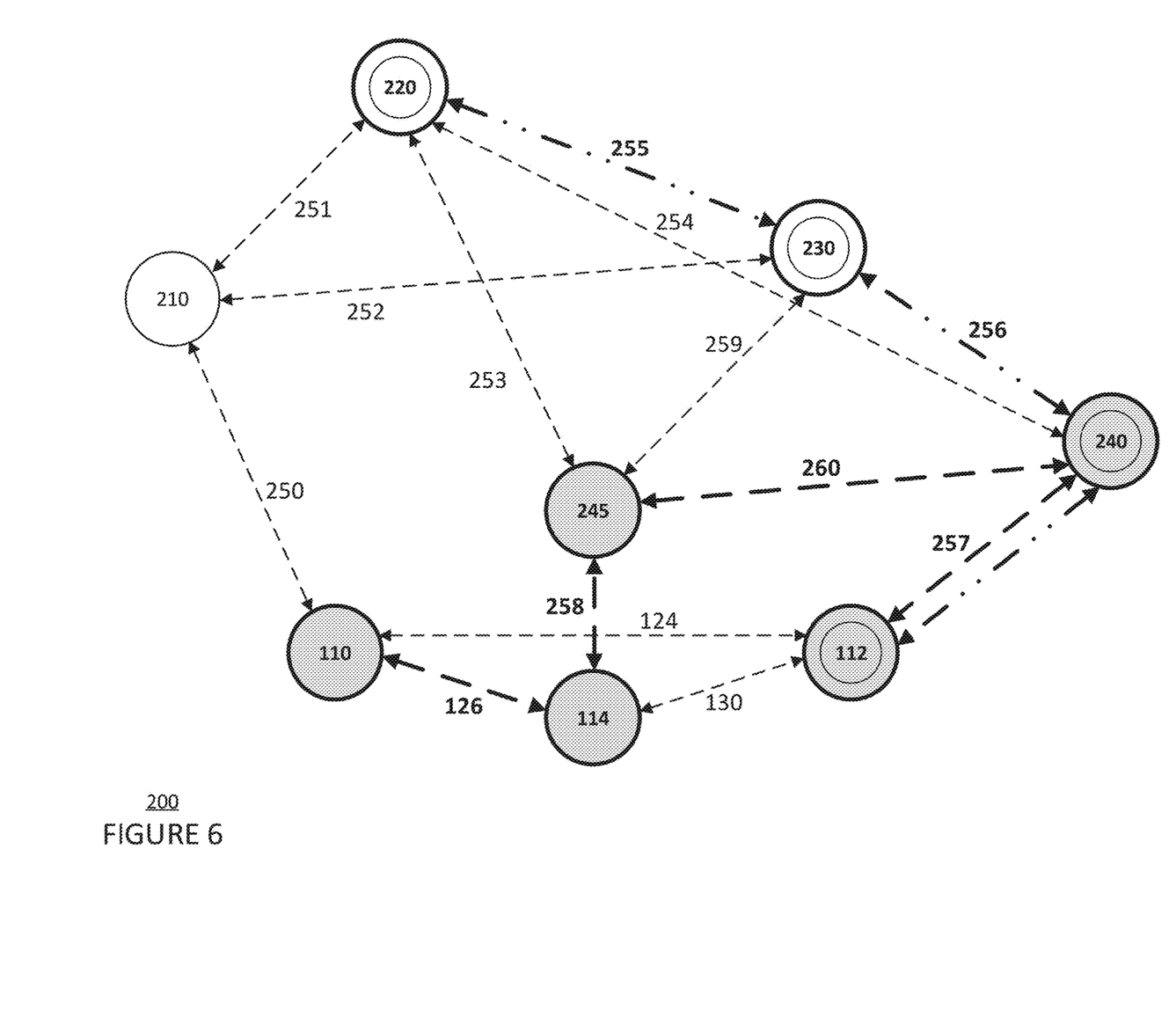
FIG. 6 is a diagram of an example network in accordance with aspects of the disclosure.

The network controller 400 may enable routing through the nodes of the network. A group of nodes in the network or a group of client devices may be identified as part of a routing path based on a network configuration generated for the network. In particular, the group of nodes or the group of client devices may be in a region identifiable using a common segment in the network address. The network configuration may be generated using temporospatial software-defined networking, self-organizing networking, big data driven networking, or machine learning methods. The generated network configuration may include a plurality of links to be formed and a plurality of routing paths through the plurality of links. The plurality of links may include the links among nodes in the given region, and at least one of the plurality of routing paths may pass through the given region. As shown in FIG. 6, a network configuration generated for network 200 may include a first routing path (shown in dashed line arrows and shaded nodes) from node 112 through link 257 to node 240, through link 260 to node 245, through link 258 to node 114, and through link 126 to node 110. Node 110 may then service one or more client devices, such as client device 152. The network configuration may also include a second routing path (shown in dash-dot-dot line arrows and circled nodes) from node 112 through link 257 to node 240, through link 256 to node 230, and through link 255 to node 220.

The network controller 400 may identify one or more target regions for a given node using common segments in the network addresses in two or more next hops for the given node. The next hops may be nodes of the network or client devices. In other words, a segment is common to all the network addresses of the nodes or client devices within an identified region. The segment may also be exclusive to the network addresses of nodes or client devices within the identified region. In this implementation, the segment is at least part of the cell identifier in the network addresses.

Identifying the one or more target regions may include, for a given node of the network, identifying two or more next hops according to the plurality of routing paths in the generated network configuration. The two or more next hops may be all of the next hops for the given node based on all of the routing paths in the network configuration or may be a subset of next hops based on some of the routing paths in the network configuration. Identifying the one or more target regions may then include identifying a common segment of the network addresses for the two or more next hops of the given node that is also not present in the other nodes or client devices, excluding or including itself. In some examples, just the site prefixes 502 of the two or more next hops or other portion corresponding to the cell identifier may be compared. In other examples, the entire network addresses of the two or more next hops may be compared. The common segment may be a part of the site prefix 502, the whole site prefix 502, the site prefix 502 and a part of the subnet identification 504, or the site prefix 502 and the subnet identification 504.

For node 240 in FIG. 6, node 245 is a first next hop in the first routing path, and node 230 is a second next hop in the second routing path. A first target region may be identified using a first segment that is common to the network addresses for nodes 230 and 245 and not present in the network addresses for nodes 110, 112, 114, 210, and 220. For node 110, client device 152 and one or more additional client devices may be targets according to the first routing path. A second target region may be identified using a second segment that is common to the network addresses for the client device 152 and the one or more additional client devices.

The network controller 400 may send forwarding rules to the given node that includes the common segment for the one or more target regions. The network controller may also send, to each node of the network, the network address assigned to the node. In FIG. 6, the network controller 400 may send forwarding rules including rules to nodes 110, 112, 114, 220, 230, 240, and 245 to enable the first routing path and the second routing path to implement the generated network configuration. The forwarding rules sent to node 240 includes the first segment as a next hop. The forwarding rules sent to node 110 includes the second segment. Other parts of the network addresses for the nodes or client devices may be omitted in the forwarding rules, and storage space may be saved as a result.

The given node, after receiving the forwarding rules may form a plurality of links using the common segments when the network configuration is being implemented. Once the plurality of links are formed, the given node may transmit data to a next hop according to a routing path identified for the data. The node 240 may be caused to form links 256 and 260 with nodes 230 and 245, respectively, because the first segment included in the forwarding rules for node 240 is part of the network addresses of both nodes 230 and 245. The one or more processors of the node 240 may access a lookup table of network addresses for nodes of the network and select the nodes having the first segment in the network addresses. The links may be formed by directing the one or more transceivers and/or the one or more antennas of the node 240 to point electronically and/or physically towards the locations of nodes 230 and 245. When data is received at node 240 in this network configuration, the one or more processors of the node 240 may identify the routing path the data is travelling on and forward the data to the appropriate next hop for the routing path. The node 110 may be caused to form a plurality of links with a plurality of client devices, including client device 152 because the second segment included in the forwarding rules for node 110 is part of the network addresses for the plurality of client devices. The one or more processors of the node 110 may access a lookup table of network addresses for client devices in a service area and select the nodes having the second segment in the network addresses. The plurality of links may be formed by directing the one or more transceivers and/or one or more antennas of node 110 to point electronically and/or physically towards the client devices.

When a moving node moves out of the given region, the network controller 400 may update the network addresses of the moving node and any forwarding rules corresponding to the moving node. The network controller 400 may monitor locations of nodes based on location information received from the plurality of nodes over time. When a new network address converted from the location information for a moving node no longer has the common segment, the network controller 400 may send the new network address to the moving node. In communications with other nodes of the network, the moving node may use the new network address.

For example, after receiving the forwarding rules, node 245 may move to a new location that is a greater distance away from node 230. Using the new location, the network controller 400 may determine a new network address using the hierarchical cell-based partitioning scheme as described above. The new network address for node 245 may not include the first segment. The network controller 400 may further determine the network configuration may still include nodes 230 and 245 as next hops for node 240. As a result, the network controller 400 may send the new network address to node 240. In addition, the network controller 400 may send new forwarding instructions to node 240 including a new segment identifying node 245 as the next hop along the routing path. Alternatively, the network controller 400 may determine a new common segment for the network addresses of nodes 230 and 245, in a same or similar way as described above.

Figure 7:
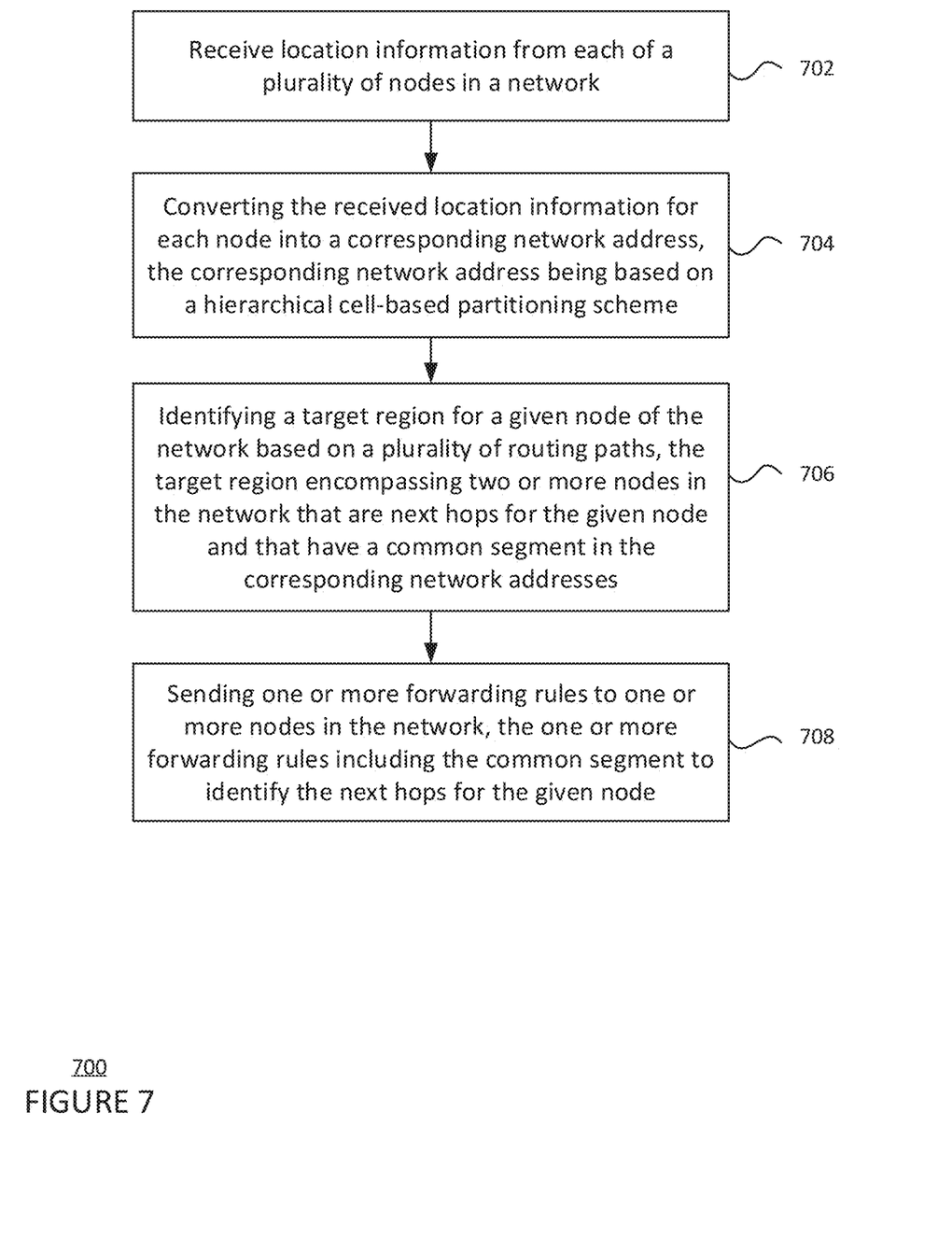
FIG. 7 is a flow diagram of a method in accordance with aspects of the disclosure.

In FIG. 7, flow diagram 700 is shown in accordance with some of the aspects described above that may be performed by one or more processors 410 of the network controller 400. While FIG. 7 shows blocks in a particular order, the order may be varied and that multiple operations may be performed simultaneously. Also, operations may be added or omitted.

At block 702, a location information is received from each of a plurality of nodes in a network. The plurality of nodes includes at least one node that is moving relative to another node of the network. For example, the network may include at least one high-altitude platform, such as a balloon, or other non-geostationary satellite. At block 704, the received location information for each node may be converted into a corresponding network address. The corresponding network address may be based on a hierarchical cell-based partitioning scheme, such as the S2 library. At block 706, a target region for a given node in the network may be identified based on a plurality of routing paths. The target region may encompass two or more nodes in the network that are next hops for the given node and that have a common segment in the corresponding network addresses. The target region may be identified as part of a network configuration generated using temporospatial software-defined networking, self-organizing networking, or machine learning methods. At block 708, one or more forwarding rules may be sent to one or more nodes of the network, the one or more forwarding rules including the common segment to identify the next hops for the given node.

In alternative implementations, one or more of the steps described above may be performed by one or more processors of a node of the network and/or a central server, instead of the one or more processors of the network controller. In addition, while the implementation discussed above focuses on regions including non-terrestrial nodes, it is also applicable to regions include terrestrial nodes of the network as needed.

In another implementation, the network controller may configure the nodes in the network to perform segment routing. After generating a network configuration, the network controller may determine a plurality of network addresses for a routing path in the network configuration based on location information of each node in the routing path. In some implementations, the determined plurality of network addresses may be converted from location information for each node using a hierarchical cell-based partitioning scheme as described above. The network controller may send the plurality of network address to a source node, where a routing path in the network configuration starts. At the source node, the plurality of network addresses may be encapsulated, using one or more processors, into a header of a packet including data to be transmitted along the routing path. A first address for a first hop may be stored in a first portion of the header, while the other subsequent addresses may be stored in a second portion of the header.

After the packet is transmitted to a next node corresponding to the first address, the first address may be removed from the first portion of the header, and a second address may be moved from the second portion to the first portion of the header. The process is then repeated at a next node corresponding to the second address using a third address until all addresses in the second portion of the header have been used. This process does not require as many forwarding rules stored at each node since the network addresses for each hop are encapsulated in the packet itself.

The technology described herein may allow for identification of nodes within a given region using a smaller amount of data. Using a hierarchical cell-based partitioning scheme, forwarding rules may be formulated based on segments that are common to a particular region. Using segment routing, forwarding rules may be encapsulated within a packet rather than requiring a separate lookup at each individual hop. As a result, the forwarding rules may be simplified and fewer updates to the forwarding rules may be needed. In addition, routing tables at each node may be reduced. Overall savings in storage, weight, and power may therefore occur.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising,
receiving location information from each of a plurality of nodes in a network, the plurality of nodes including at least one node that is moving relative to another node of the network;
converting the received location information for each node into a corresponding network address, the corresponding network address being based on a hierarchical cell-based partitioning scheme;
identifying, by one or more processors of a network controller, a target region for a given node of the network based on a plurality of routing paths, the target region encompassing two or more nodes in the network that are next hops for the given node and that have a common segment in the corresponding network addresses, wherein the two or more nodes in the target region include a moving node;
sending, by the one or more processors of the network controller, one or more forwarding rules to one or more nodes in the network, the one or more forwarding rules including the common segment to identify the next hops for the given node;
receiving new location information for the moving node;
determining a new network address for the moving node based on the new location information; and
when the new network address does not have the common segment, sending, by the one or more processors of the network controller, the new network address to the moving node.

2. The method of claim 1, wherein the hierarchical cell-based partitioning scheme is based on a spherical geometry library.

3. The method of claim 1, wherein the converting of the received location information for each node includes:
for each node of the plurality of nodes, projecting a location of the node into a model of the Earth and a cube encapsulating the Earth using the location information from the node, the cube encapsulating the Earth being partitioned using the hierarchical cell-based partitioning scheme into a plurality of cells; and
determining the corresponding network address for the location of the node based on a given cell of the plurality of cells in which the projected location falls.

4. The method of claim 3, wherein the corresponding network address includes a segment of a cell identifier of the given cell.

5. The method of claim 1, wherein the converting of the received location information for each node includes retrieving, from a database, a cell identifier that corresponds with a location of the node based on the received location information, the cell identifier being derived from the hierarchical cell-based partitioning scheme.

6. The method of claim 1, wherein the identifying the target region includes generating a network configuration for the network for the plurality of routing paths.

7. The method of claim 1, further comprising sending, by the one or more processors of the network controller, the corresponding network address to each node of the plurality of nodes in the network.

8. The method of claim 1, further comprising:
determining, by the one or more processors of the network controller, a routing path through the network based on the location information of the plurality of nodes, the routing path identifying a source node and a plurality of next hops; and
wherein the sending of the one or more forwarding rules includes sending instructions to the source node for encapsulating the plurality of next hops in a header of a packet for segment routing along the routing path.

9. A network controller for a network, the network including at least one node that is moving relative to another node, the network controller comprising:
one or more processors configured to:
receive location information from each of a plurality of nodes in the network;
convert the received location information for each node into a corresponding network address, the corresponding network address being based on a hierarchical cell-based partitioning scheme;
identify a target region for a given node in the network based on a plurality of routing paths, the target region encompassing two or more nodes in the network and that are next hops for the given node that have a common segment in the corresponding network addresses, wherein the two or more nodes in the target region include a moving node;

send one or more forwarding rules to the one or more nodes in the network, the one or more forwarding rules including the common segment to identify the next hops for the given node;

receive new location information for the moving node;

determine a new network address for the moving node based on the new location information; and when the new network address does not have the common segment, send the new network address to the moving node.

10. The network controller of claim 9, wherein the hierarchical cell-based partitioning scheme is based on spherical geometry library.

11. The network controller of claim 9, wherein the one or more processors are further configured to convert the received location information for each node based on a location of a node in a model of the Earth, wherein the model of the Earth includes a cube encapsulating the Earth that is partitioned using the hierarchical cell-based partitioning scheme into a plurality of cells.

12. The network controller of claim 11, wherein the corresponding network address includes a segment of a cell identifier of one of the plurality of cells in which the node is located in the model of the Earth.

13. The network controller of claim 9, wherein the one or more processors are configured to convert the received location information for each node based on a database on which are stored a cell identifier that corresponds with a location of the node, the cell identifier being derived from the hierarchical cell-based partitioning scheme.

14. The network controller of claim 9, wherein the one or more processors are further configured to generate a network configuration for the network for the plurality of routing paths.

15. The network controller of claim 9, wherein the one or more processors are further configured to send the corresponding network address to each node of the plurality of nodes in the network.

16. The network controller of claim 9, wherein the one or more processors are further configured to:

determine a routing path through the network based on the location information of the plurality of nodes, the routing path identifying a source node and a plurality of next hops; and wherein the one or more forwarding rules includes instructions to the source node for encapsulating the plurality of next hops in a header of a packet for segment routing along the routing path.

17. A tangible, non-transitory computer-readable storage medium configured to store instructions, the instructions, when executed by one or more processors, cause the one or more processors to perform a method, the method comprising:

receiving location information from each of a plurality of nodes in a network, the plurality of nodes including at least one node that is moving relative to another node of the network;

converting the received location information for each node into a corresponding network address, the corresponding network address being based on a hierarchical cell-based partitioning scheme;

identifying a target region for a given node in the network based on a plurality of routing paths, the target region encompassing two or more nodes in the network that are next hops for the given node and that have a common segment in the corresponding network addresses, wherein the two or more nodes in the target region include a moving node; and sending one or more forwarding rules to one or more nodes in the network, the one or more forwarding rules including the common segment to identify the next hop for the given node;

receiving new location information for the moving node;

determining a new network address for the moving node based on the new location information; and when the new network address does not have the common segment, sending the new network address to the moving node.

18. The medium of claim 17, wherein the hierarchical cell-based partitioning scheme is based on a spherical geometry library.

* * * * *